(12) United States Patent
Chen (10) Patent No.: US 7,195,030 B2
(45) Date of Patent: Mar. 27, 2007

(54) BICYCLE PUMP VALVE

(76) Inventor: Chiang-Pei Chen, No. 2, Lane 187, Hsi Hu Road, Ta Li City, Taichung Hsien (TW)

( * ) Notice: Subject to any disclaimer, the term of this patent is extended or adjusted under 35 U.S.C. 154(b) by 155 days.

(21) Appl. No.: 11/035,820

(22) Filed: Jan. 14, 2005

(65) Prior Publication Data

US 2005/0121077 A1 Jun. 9, 2005

Related U.S. Application Data

(63) Continuation-in-part of application No. 10/126,135, filed on Apr. 19, 2002, now abandoned.

(51) Int. Cl.
*F16K 15/20* (2006.01)
*F16K 11/065* (2006.01)

(52) U.S. Cl. .................. 137/223; 137/231; 137/625.48

(58) Field of Classification Search ................ 137/223, 137/231, 625.48, 872, 873
See application file for complete search history.

(56) References Cited

U.S. PATENT DOCUMENTS

| 1,838,166 | A |   | 12/1931 | Wahl | ........................ | 137/223 |
| 2,344,492 | A |   | 3/1944 | Brubanker | ................. | 137/223 |
| 2,474,286 | A |   | 6/1949 | Snyder | .................. | 137/625.48 |
| 2,716,998 | A |   | 9/1955 | Knasko | ........................ | 137/231 |
| 2,869,573 | A |   | 1/1959 | Stafford | ...................... | 137/223 |
| 2,880,747 | A |   | 4/1959 | Newcomb | ................... | 137/223 |
| 3,044,491 | A |   | 7/1962 | Sangster | ................ | 137/625.48 |
| 3,827,635 | A |   | 8/1974 | Krakowski et al. | ......... | 137/223 |
| 3,933,177 | A |   | 1/1976 | Dwyer | ...................... | 137/223 |
| 4,423,741 | A |   | 1/1984 | Levy | ..................... | 137/625.48 |
| 4,921,402 | A |   | 5/1990 | Nelson | ................... | 137/625.48 |
| 5,666,990 | A | * | 9/1997 | Wu | ............................ | 137/223 |
| 5,785,076 | A |   | 7/1998 | You | .............................. | 137/223 |
| 5,855,222 | A |   | 1/1999 | Jou | ............................. | 137/223 |
| 5,921,269 | A |   | 7/1999 | Wu | ............................. | 137/223 |
| 6,314,985 | B1 | * | 11/2001 | van der Blom | ............ | 137/223 |
| 2003/0196699 | A1 |   | 10/2003 | Chen |   |   |

\* cited by examiner

*Primary Examiner*—John Rivell
(74) *Attorney, Agent, or Firm*—Alan D. Kamrath; Nikolai & Mersereau, P.A.

(57) ABSTRACT

A valve includes a housing, a first nozzle, a second nozzle and a switch. The housing defines an inlet channel for communication with a pump, a chamber in communication with the inlet channel, a first outlet channel in communication with the chamber and a second outlet channel in communication with the chamber. The first nozzle is in communication with the first outlet channel. The second nozzle is in communication with the second outlet channel. The switch is received in the chamber and movable between a first position where the inlet is communicated with the first outlet channel through the chamber and a second position where the inlet is communicated with the second outlet channel through the chamber. The first nozzle is for engagement with an inlet of a tire. The second nozzle is for engagement with an inlet of a pneumatically adjustable cushion.

8 Claims, 12 Drawing Sheets

BICYCLE PUMP VALVE

CROSS REFERENCE TO RELATED APPLICATION

This is a continuation-in-part application of U.S. patent application Ser. No. 10/126,135 filed on Apr. 19, 2002, now abandoned.

BACKGROUND OF INVENTION

1. Field of Invention

The present invention relates to a bicycle pump valve.

2. Related Prior Art

Many bikers carry portable pumps on in their bicycles for pumping tires. From such a portable pump extends a flexible pipe connected with a nozzle for engagement with an inlet of a tire. Now, many bicycles are equipped with pneumatically adjustable cushions. Air can be pumped into such a cushion so as to extend its length, thus rendering the cushion "softer." Of course, air can be released from the cushion so as to reduce its length, thus rendering the cushion "harder." For a bicycle equipped with pneumatically adjustable cushions, a portable pump is responsible for pumping the tires and the cushions. However, a cushion requires a higher pressure than a tire does. It is found that a nozzle designed for engagement with an inlet of a tire often fails engagement with an inlet of a cushion for being unable to sustain an ultra-high pressure during pumping. To avoid this problem, a portable pump may be equipped with an additional nozzle that is designed for engagement with an inlet of a cushion and can sustain an ultra-high pressure during pumping. However, such an ultra-high pressure nozzle is often forgotten or lost, thus rendering it impossible to pump the cushion. Besides, it is always troublesome to replace an ordinary nozzle with an ultra-high pressure nozzle and vice versa. Moreover, engagement of the ordinary or ultra-high pressure nozzle with the flexible pipe leading from the pump becomes loose after replacement takes place multiple times.

The present invention is intended to obviate or at least alleviate the problems encountered in the prior art.

SUMMARY OF INVENTION

It is the primary objective of the present invention to provide a valve for tight engagement with an inlet of a tire or pneumatically adjustable cushion.

According to the present invention, a valve includes a housing, a first nozzle, a second nozzle and a switch. The housing defines an inlet channel for communication with a pump, a chamber in communication with the inlet channel, a first outlet channel in communication with the chamber and a second outlet channel in communication with the chamber. The first nozzle is in communication with the first outlet channel. The second nozzle is in communication with the second outlet channel. The switch is received in the chamber and movable between a first position where the inlet is communicated with the first outlet channel through the chamber and a second position where the inlet is communicated with the second outlet channel through the chamber. The first nozzle is for engagement with an inlet of a tire. The second nozzle is for engagement with an inlet of a pneumatically adjustable cushion.

In a first aspect, the switch can slide. The switch includes a piston and a rod extending from the piston, wherein the piston blocks the inlet from the second outlet channel in the first position, wherein the piston blocks the inlet from the first outlet channel in the second position. The switch defines the second outlet channel. The second outlet channel includes a first end in the piston and a second end in the rod. The inlet channel includes a first end for communication with the pump and a second end communicated with the chamber. The first outlet channel includes a first end communicated with the chamber and a second end communicated with first nozzle. The valve includes a ring mounted on the piston so as to divide the chamber into two regions. In the first position, the second end of the inlet channel and the first end of the first outlet channel are in a region of the chamber while the first end of the second outlet channel is in the other region of the chamber. In the second position, the second end of the inlet channel and the first end of the second outlet channel are in a region of the chamber while the first end of the first outlet channel is in the other region of the chamber.

In a second aspect, the switch can rotate in the chamber. The switch defines a channel through which the inlet channel is communicated with the first outlet channel in the first position and with the second outlet channel in the second position.

Other objectives, advantages, and novel features of the invention will become more apparent from the following detailed description when taken in conjunction with the attached drawings.

BRIEF DESCRIPTION OF DRAWINGS

The present invention is described through detailed illustration of embodiments referring to the attached drawings wherein.

DETAILED DESCRIPTION OF EMBODIMENTS

Figure 1:
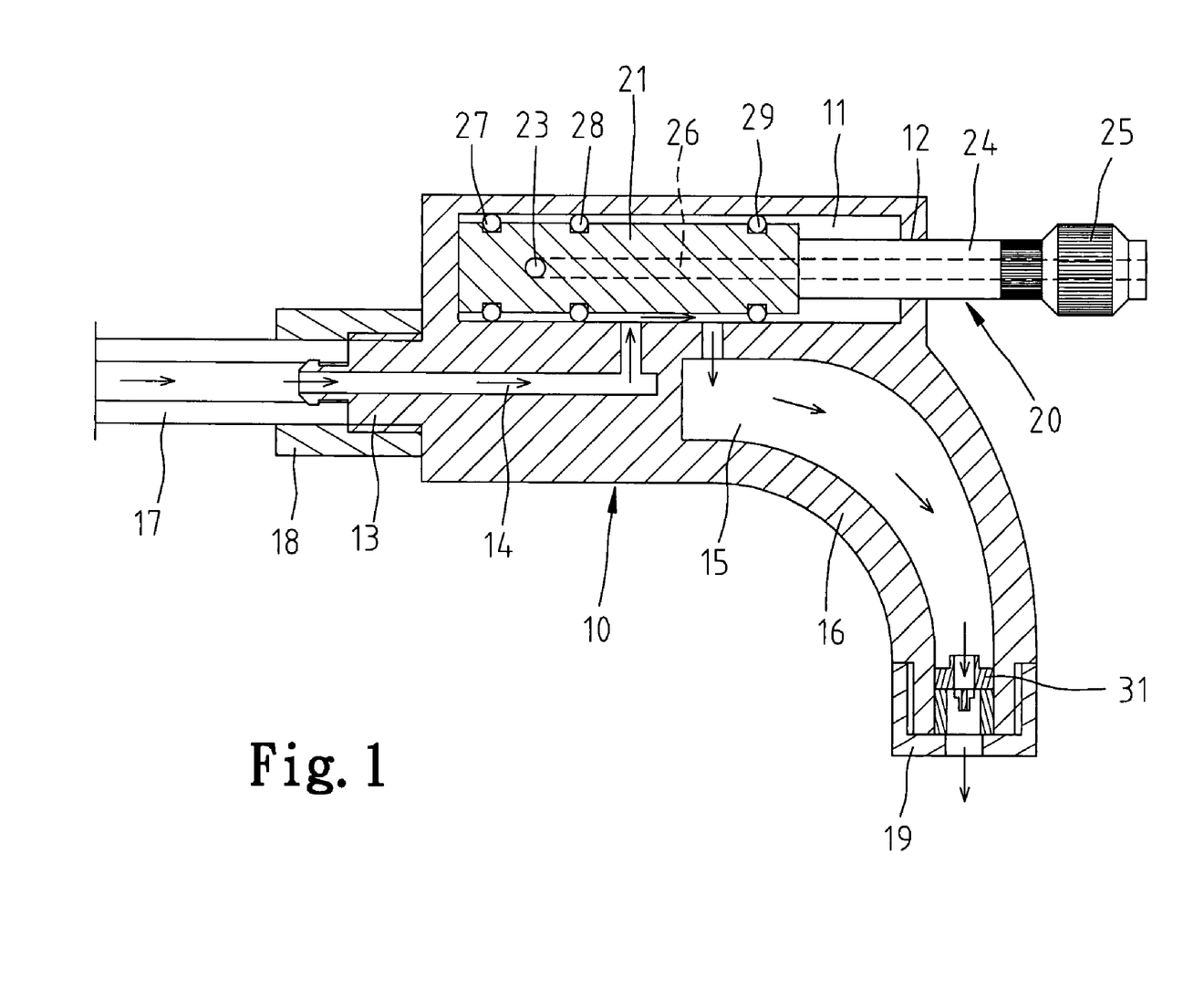
FIG. 1 is a cross-sectional view of a valve according to a first embodiment of the present invention in communication with a flexible pipe extending from a pump, showing the valve in a position for pumping air through an ordinary nozzle.
Figure 2:
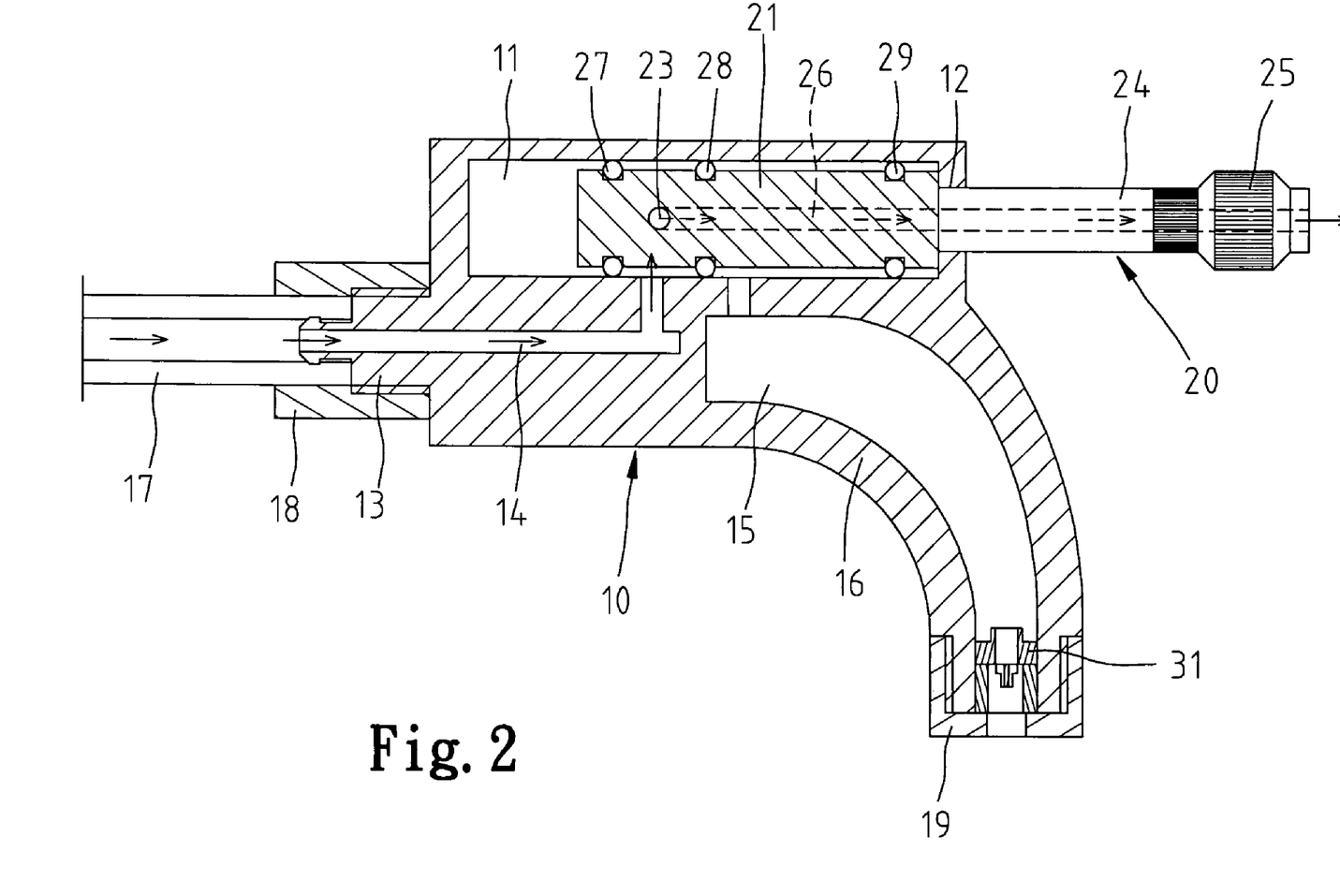
FIG. 2 is similar to FIG. 1 except for showing the valve in a position for pumping air through an ultra-high pressure nozzle.

Referring to FIGS. 1 and 2, a valve according to a first embodiment of the present invention includes a housing 10, an ordinary nozzle 31, an ultra-high pressure nozzle 25 and a switch 20.

The housing 10 defines a chamber 11, a hole 12 communicated with the chamber 11, an inlet channel 14 in communication with the chamber 11 and an outlet channel 15 in communication with the chamber 11.

The inlet channel 14 extends through a joint 13 projecting from the housing 10 and includes a first end that is open to the external of the housing 10 and a second end that is open to the chamber 11. The joint 13 includes a root and a tip thinner than the root. The tip of the joint 13 can be inserted in an end of a flexible pipe 17 leading from a pump (not shown). Thus, air can be provided from the pump to the valve. A ring 18 secured to the end of the flexible pipe 17 can be engaged with the root of the joint 13. Thus, communication of the pump with the valve is ensured.

The outlet channel 15 extends through a joint 16 projecting from the housing 10 and includes a first end that is open to the chamber 11 and a second end that is open to the external of the housing 10. The ordinary nozzle 31 is received in the second end of the outlet channel 15. A ring 19 is engaged with an end of the joint 16, thus retaining the ordinary nozzle 31 in the second end of the outlet channel 15.

The switch 20 includes a piston 21 and a rod 24 projecting from the piston 21. The piston 21 is movably received in the chamber 11. The rod 24 is inserted through the hole 12. The ultra-high pressure nozzle 25 is secured to an end of the rod 24 that is exposed to the external of the housing 10.

The periphery of the piston 21 defines a hole 23. The switch 20 defines an outlet channel 26 extending in a radial direction from the hole 23. The outlet channel 26 turns and extends axially in the piston 21 and through the rod 24.

Rings 27, 28 and 29 are respectively received in three annular grooves (not numbered) defined in the periphery of the piston 21. The rings 27, 28 and 29 all contact the wall of the chamber 11, thus partitioning the chamber 11 into several regions that are not in communication with one another. The hole 23 is located between the rings 27 and 28.

FIG. 1 shows the valve in a first position where air can be pumped through the ordinary nozzle 31. In the first position, the second end of the inlet channel 14 and the first end of the outlet channel 15 are located between the rings 28 and 29. Thus, the inlet channel 14 is communicated with the outlet channel 15 through a region of the chamber 11 confined between the rings 28 and 29. The second end of the inlet channel 14 is not located between the rings 27 and 28. Thus, the inlet channel 14 is not communicated with the outlet channel 26 through a region of the chamber 11 confined between the rings 27 and 28. The ordinary nozzle 31 can be engaged with an inlet of a tire. Thus, air can be provided from the pump to the tire through the ordinary nozzle 31 of the valve. Under this condition, a French valve and an American valve could be adapted to engage with the nozzle for inflating bicycle tires.

FIG. 2 shows the valve in a second position where air can be pumped through the ultra-high pressure nozzle 25. In the second position, the second end of the inlet channel 14 is located between the rings 27 and 28. Thus, the inlet channel 14 is communicated with the outlet channel 26 through the region of the chamber 11 confined between the rings 27 and 28. The first end of the outlet channel 15 is located outside the region of the chamber 11 confined between the rings 27 and 28. Thus, the inlet channel 14 is not communicated with the outlet channel 15. The ultra-high pressure nozzle 25 can be engaged with an inlet of a pneumatically adjustable cushion. Thus, air can be provided from the pump to the pneumatically adjustable cushion through the ultra-high pressure nozzle 25 of the valve. Under this condition a Japanese valve, or a German valve could be adapted to engaged with the nozzle for inflating bicycle tires, and a suspension front fork or an inflation needle for balls could be adapted to engaged with the nozzle for inflating.

Figure 3:
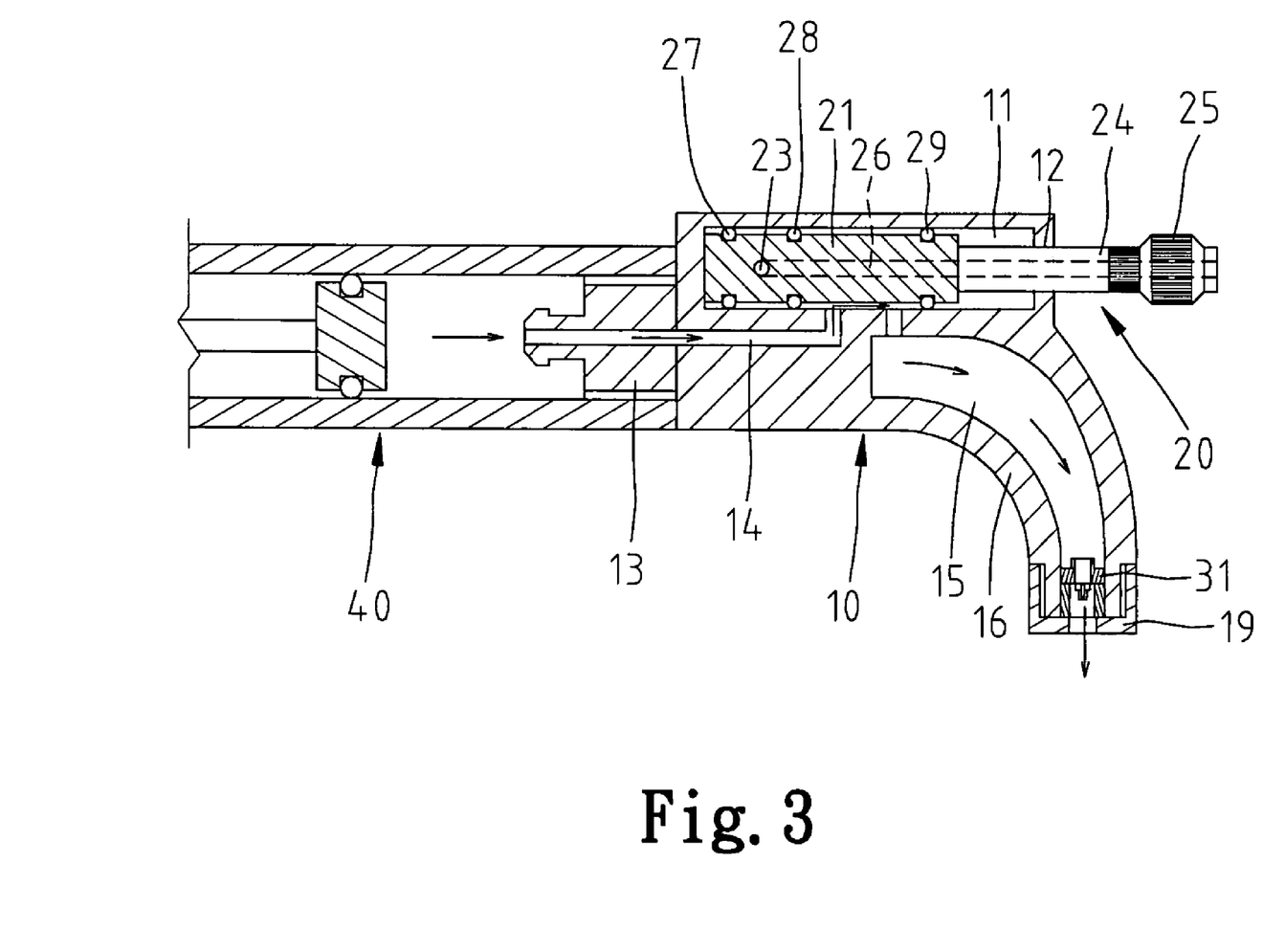
FIG. 3 is similar to FIG. 1 except for showing the valve directly connected with a cylinder of a pump.
Figure 4:
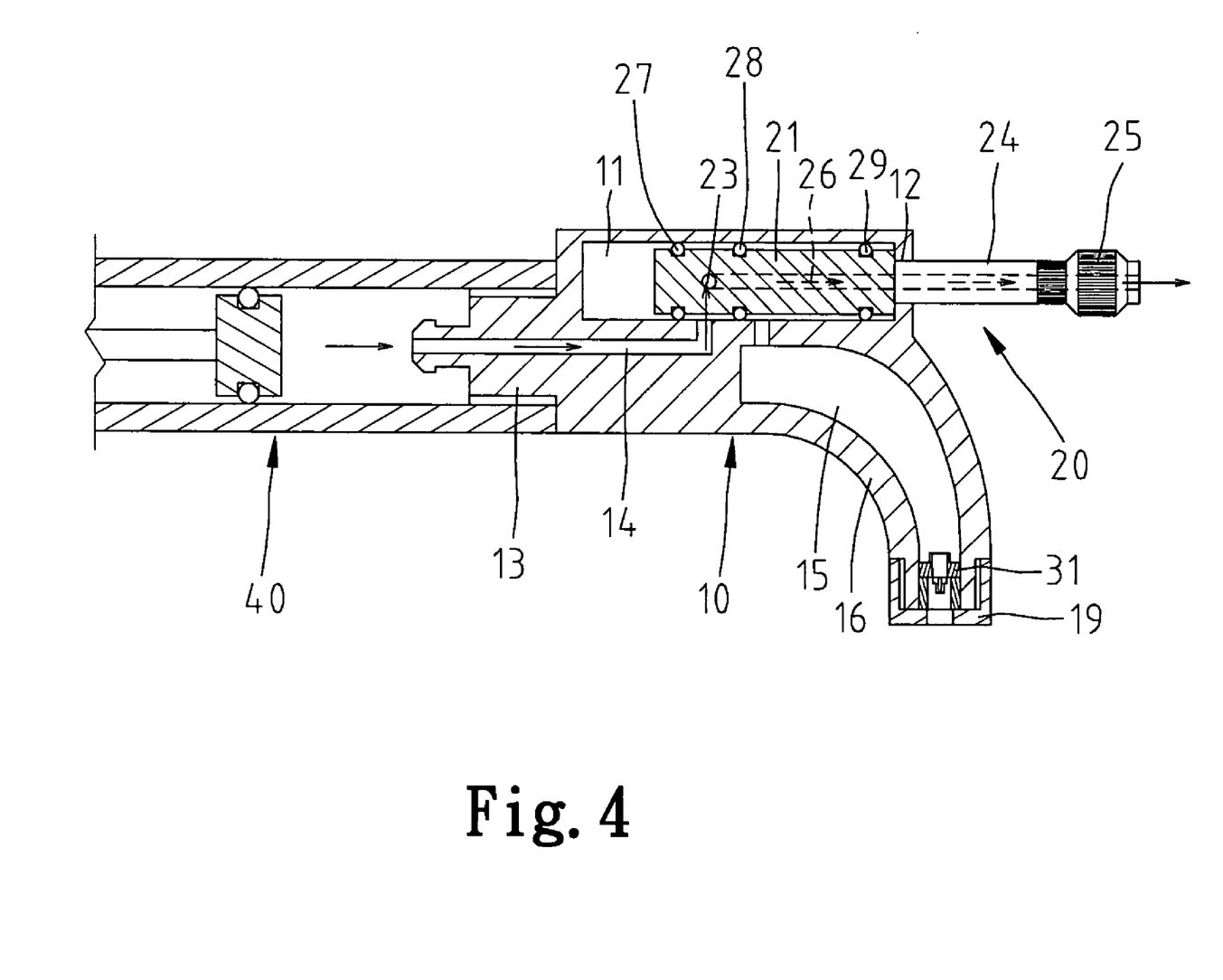
FIG. 4 is similar to FIG. 3 except for showing the valve in a position for pumping air through an ultra-high pressure nozzle.
Figure 5:
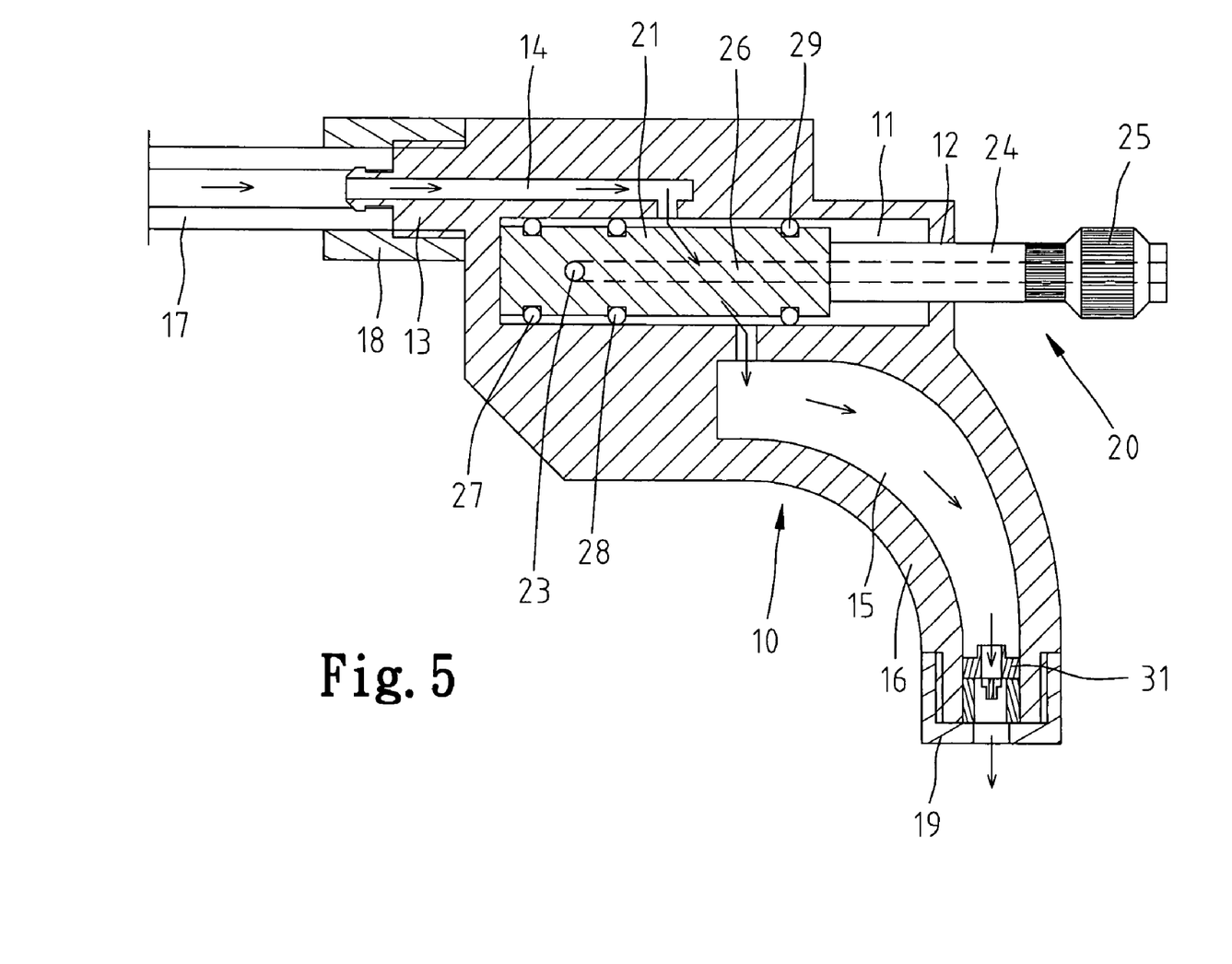
FIG. 5 is a cross-sectional view of a valve according to a second embodiment of the present invention in communication with a flexible pipe extending from a pump, showing the valve in a position for pumping air through an ordinary nozzle.
Figure 6:
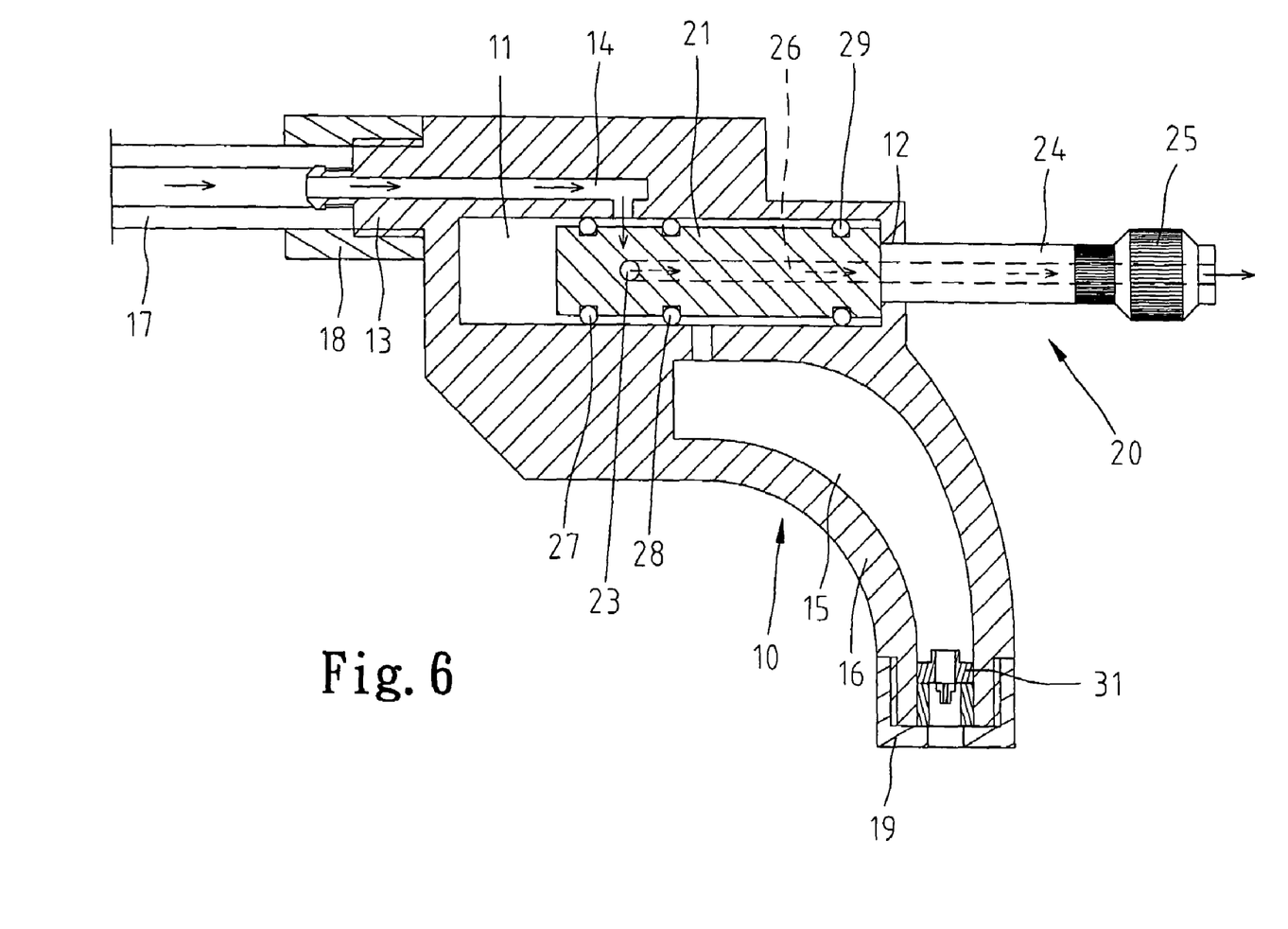
FIG. 6 is similar to FIG. 5 except for showing the valve in a position for pumping air through an ultra-high pressure nozzle.
Figure 7:
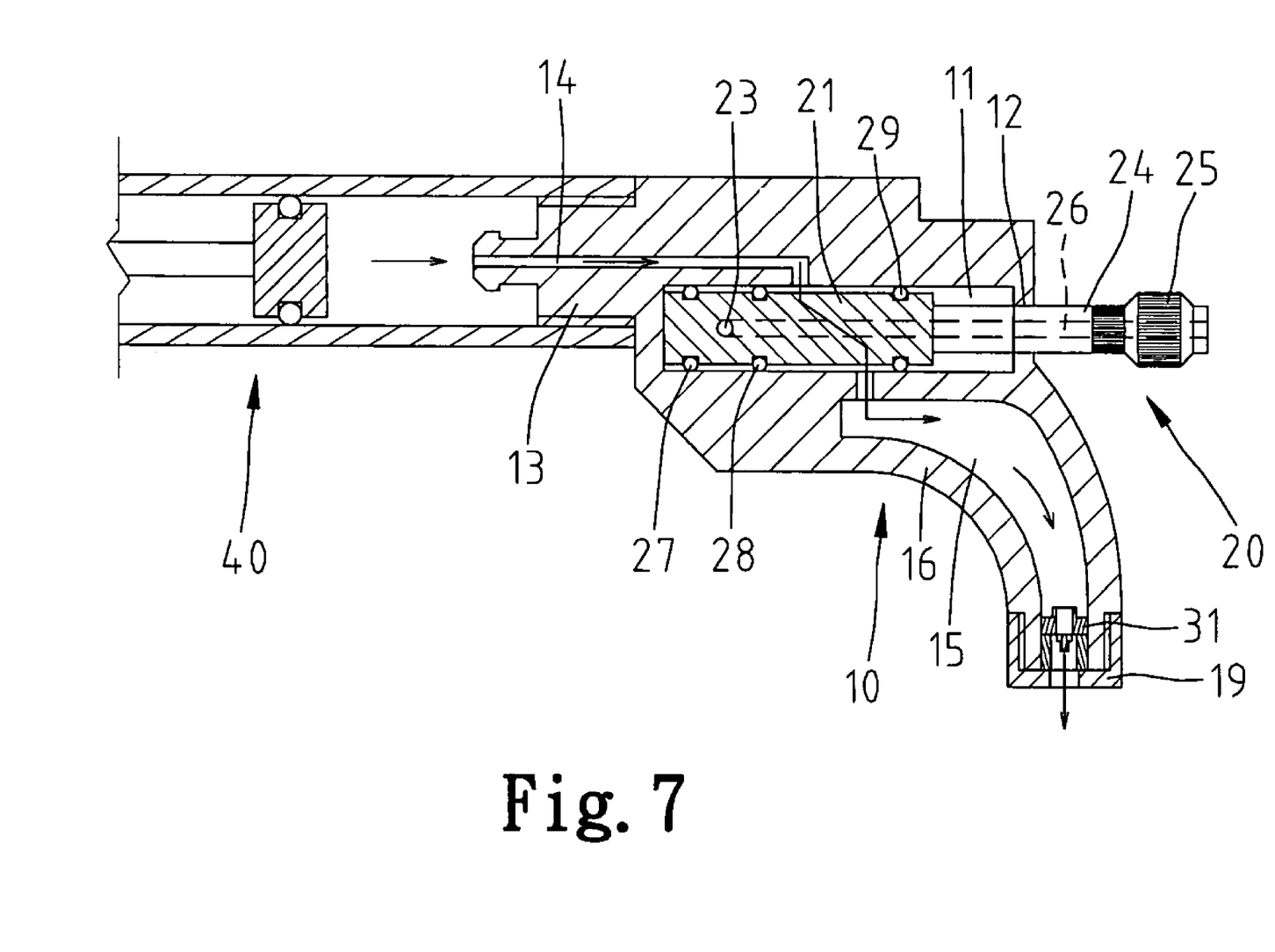
FIG. 7 is similar to FIG. 5 except for showing the valve directly connected with a cylinder of a pump.
Figure 8:
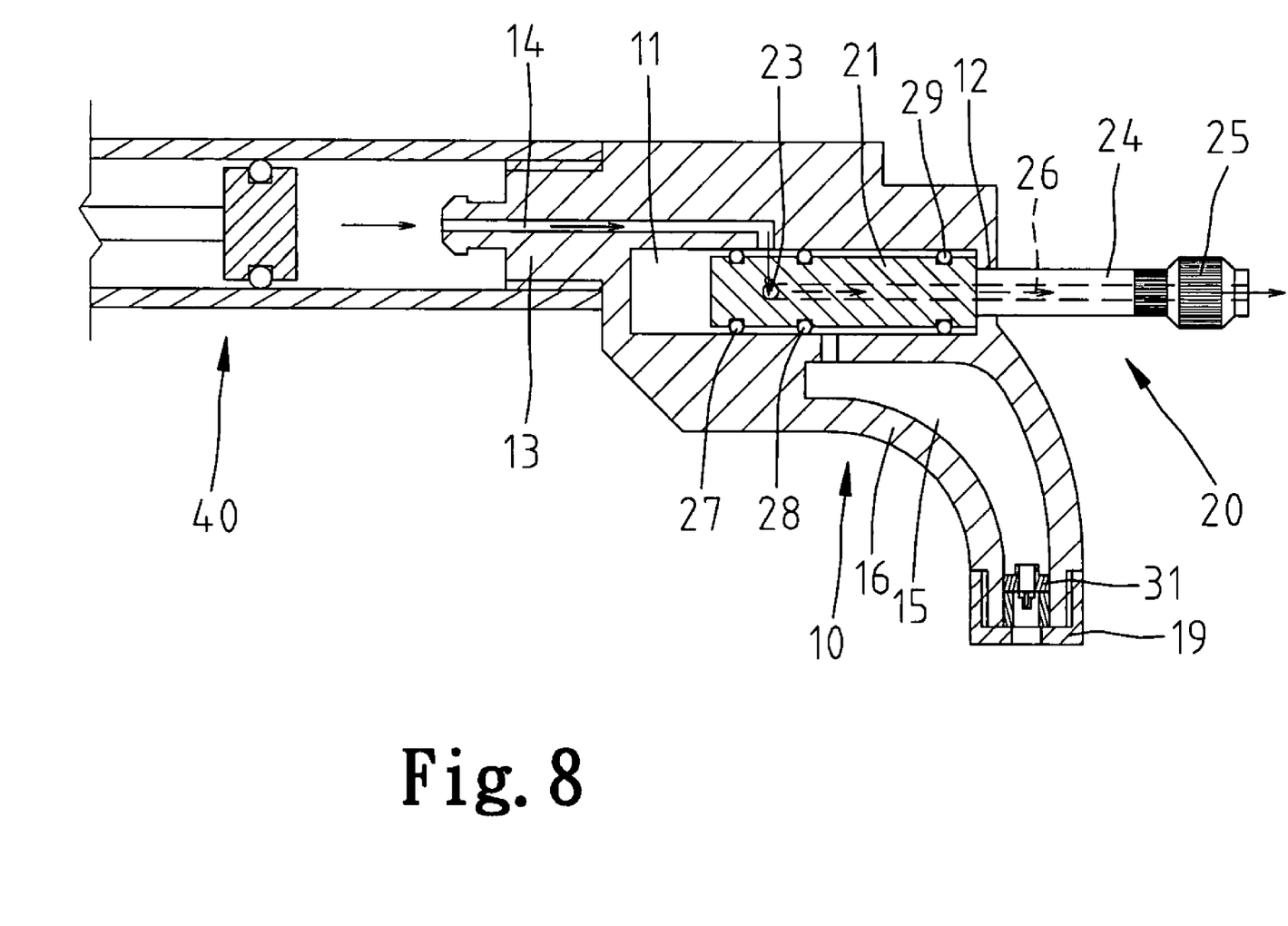
FIG. 8 is similar to FIG. 7 except for showing the valve in a position for pumping air through an ultra-high pressure nozzle.

Referring to FIGS. 3 and 4, the joint 13 of the valve is directly engaged with a cylinder 40 of the pump instead of communication through the flexible pipe 17.

Referring to FIGS. 5~8, a valve according to a second embodiment of the present invention is shown. The second embodiment is identical to the first embodiment except that the joints 13 and 16 are located on two opposite sides of the chamber 11.

FIGS. 9~12 show a valve according to a third embodiment of the present invention. The third embodiment uses a housing 10' and a switch 50 in place of the housing 10 and the switch 20. The housing 10' defines an inlet channel 14' and an outlet channel 15' instead of the inlet channel 14 and the outlet channel 15. The housing 10' defines a cylindrical chamber 52 and an outlet channel 53. The cylindrical chamber 52 is in communication with the chamber 11 through the outlet channel 53. The inlet channel 14' is in communication with the cylindrical chamber 52 instead of the chamber 11. The outlet channel 15' includes a first end that is open to the cylindrical chamber 52 instead of the chamber 11. The switch 50 is shaped as a shaft defining a transverse channel 51. The switch 50 is inserted and can be rotated in the cylindrical chamber 52.

The third embodiment uses a core 21' instead of the piston 21. The core 21' is identical to the piston 21 except for defining only two annular grooves 22 for receiving only two rings 27 and 28. In operation, the core 21' does not slide in the chamber 11, because it is not a component of a switch.

Figure 9:
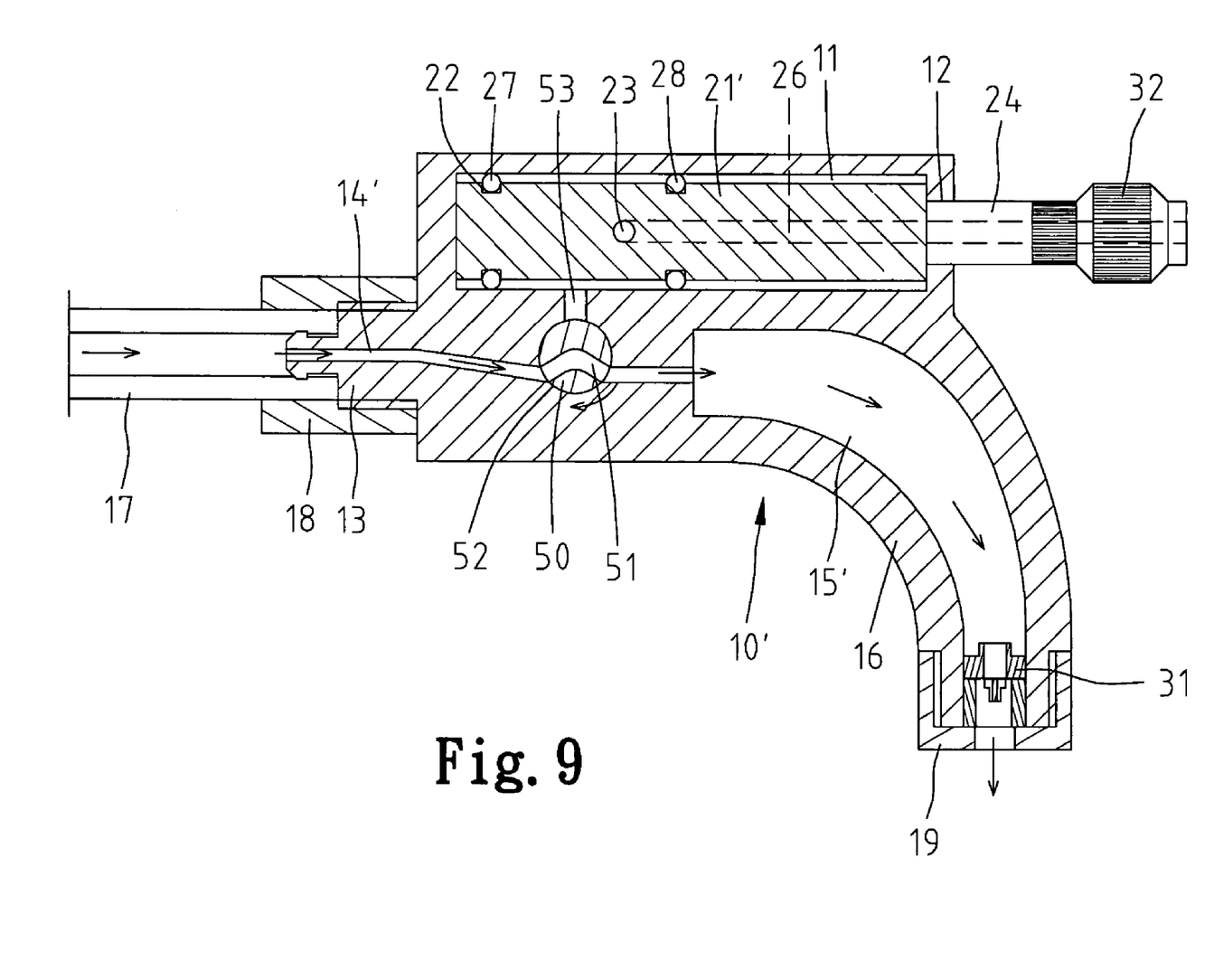
FIG. 9 is a cross-sectional view of a valve according to a third embodiment of the present invention in communication with a flexible pipe extending from a pump, showing the valve in a position for pumping air through an ordinary nozzle.

FIG. 9 shows the valve in a position wherein air can be pumped through the ordinary nozzle 31. In the first position, the second end of the inlet channel 14' is in communication with the first end of the outlet channel 15' through the channel 51.

Figure 10:
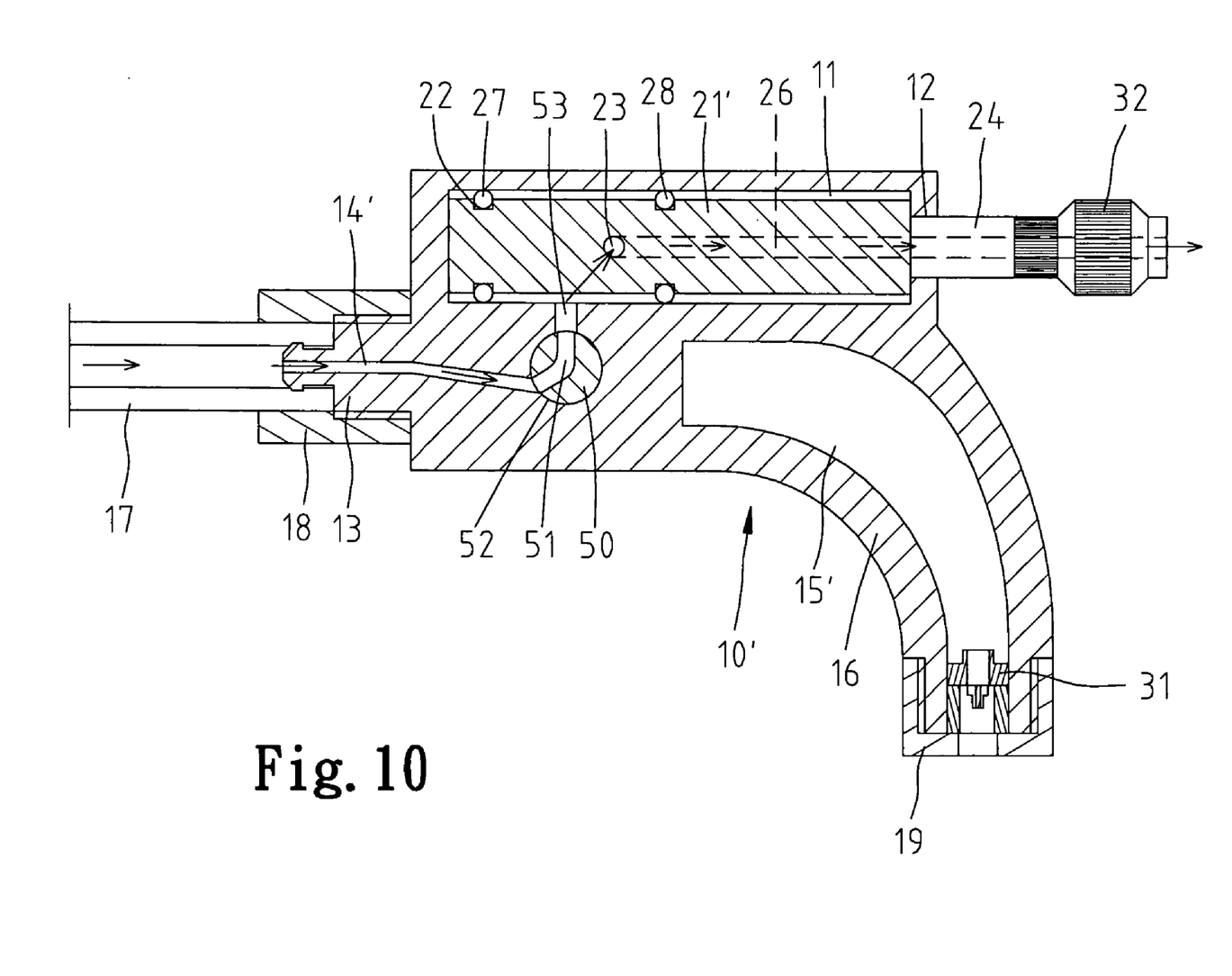
FIG. 10 is similar to FIG. 9 except for showing the valve in a position for pumping air through an ultra-high pressure nozzle.

FIG. 10 shows the valve in a second position where air can be pumped through an ultra-high pressure nozzle 32. In the second position, the second end of the inlet channel 14' is in communication with the outlet channel 53 through the channel 51. The channel 53 is communicated with the outlet channel 26 through the region of the chamber 11 confined between the rings 27 and 28.

Figure 11:
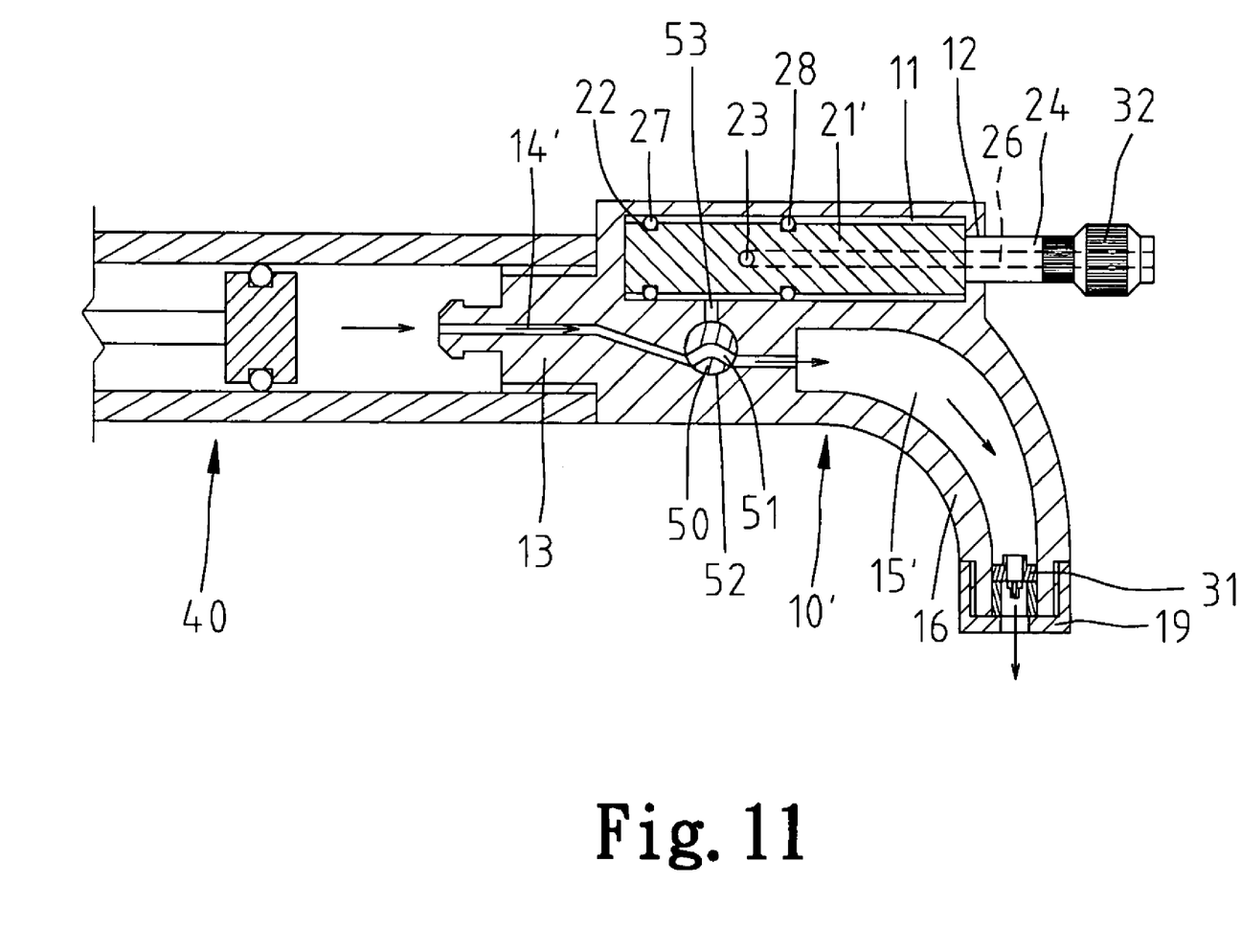
FIG. 11 is similar to FIG. 9 except for showing the valve directly connected with a cylinder of a pump.
Figure 12:
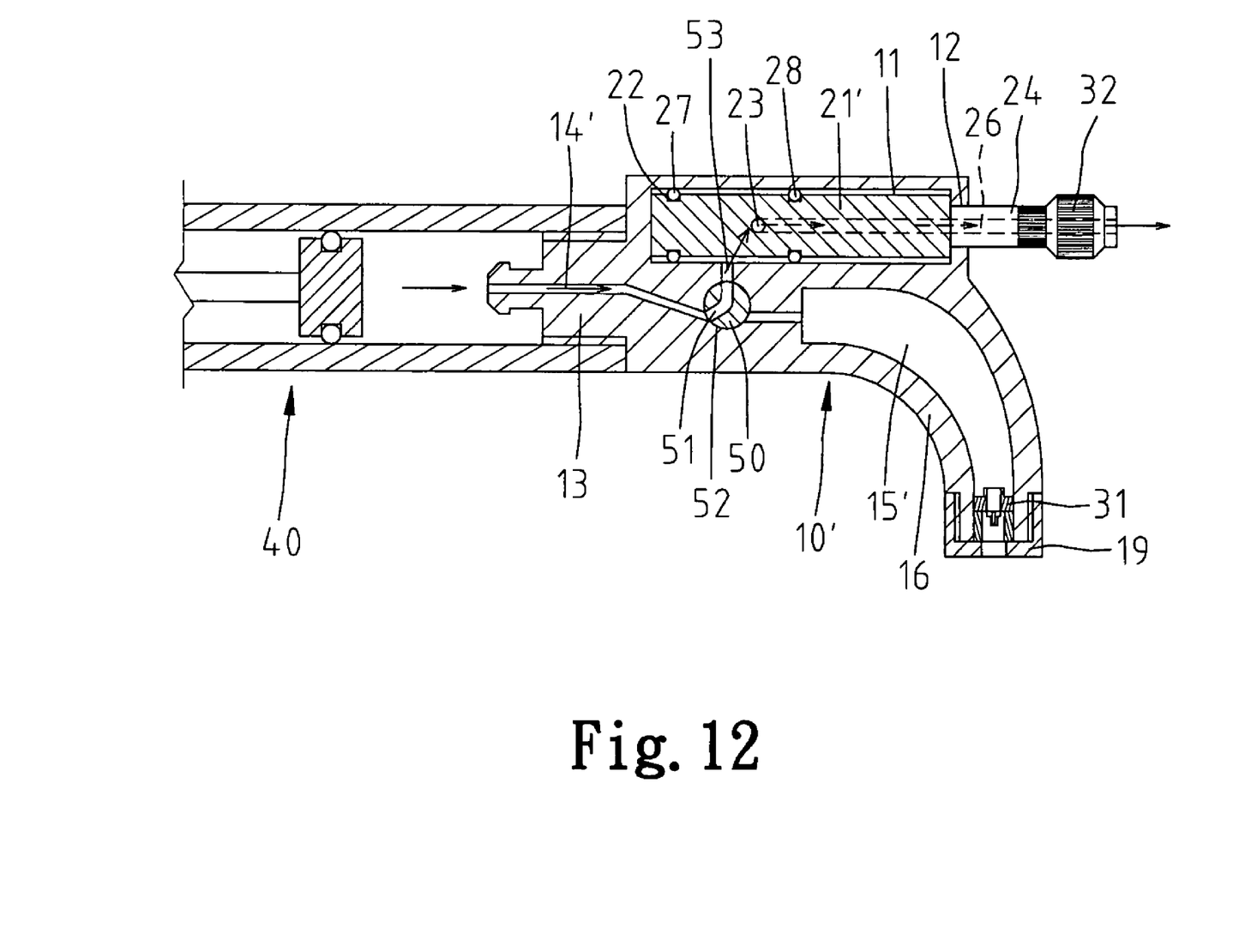
FIG. 12 is similar to FIG. 11 except for showing the valve in a position for pumping air through an ultra-high pressure nozzle.

Referring to FIGS. 11 and 12, the joint 13 of the valve is directly engaged with a cylinder 40 of the pump instead of through the flexible pipe 17.

The present invention has been described through detailed illustration of several embodiments. Those skilled in the art can derive many variations from the embodiments without departing from the scope of the present invention. Therefore, the embodiments shall not limit the scope of the present invention that can only be defined in the attached claims.

The invention claimed is:

1. A bicycle pump valve including:

a housing defining an inlet channel for communication with a pump, a chamber in communication with the inlet channel, a first outlet channel in communication with the chamber and a second outlet channel in communication with the chamber, with the chamber having a first axial end and a second axial end spaced in an axial direction from the first axial end;

a first nozzle in communication with the first outlet channel, with the first nozzle adapted to engage with an inlet of a tire;

a second nozzle in communication with the second outlet channel, with the second nozzle being an ultra-high pressure nozzle adapted to engage with an inlet of a pneumatically adjustable cushion;

a switch slideably received in the chamber and movable in the axial direction between a first position where the inlet channel is communicated with the first outlet channel through the chamber and a second position where the inlet channel is communicated with the second outlet channel through the chamber, wherein the switch includes a piston and a rod extending from the piston in the axial direction, with the rod having smaller cross sections perpendicular to the axial direction than the piston and extending through the second axial end of the chamber, with the piston being slideable in the chamber between the first and second positions, with the piston abutting with the first axial end of the chamber in the first position and abutting with the second axial end of the chamber around the rod in the second position, wherein the switch defines the second outlet channel located within the piston and the rod, wherein the second outlet channel includes a first end in the piston located within the chamber and a second end in the rod outside of the chamber, wherein the inlet channel includes a first end for communication with the pump and a second end located in the chamber between the first and second axial ends, wherein the first outlet channel includes a first end located in the chamber between the first and second axial ends and a second end in communication with first nozzle, with the second end of the inlet channel being spaced in the axial direction from the first end of the first outlet channel; and a ring mounted on the piston so as to divide the chamber into two regions, wherein the second end of the inlet channel and the first end of the first outlet channel are in a region of the chamber and communicate with each other through the chamber while the first end of the second outlet channel is in the other region of the chamber and the piston blocks the inlet channel from the second outlet channel in the first position, wherein the second end of the inlet channel and the first end of the second outlet channel are in a region of the chamber while the first end of the first outlet channel is in the other region of the chamber and communicate with each other through the chamber and the piston blocks the inlet channel from the first outlet channel in the second position.

2. The pump valve according to claim 1 further comprising a cylinder, with the housing directly engaged with the cylinder, with the cylinder slideably receiving a reciprocal piston to define the pump.

3. The pump valve according to claim 1 wherein the second nozzle is adapted to engage with a needle JV' of a Japanese valve JV.

4. The pump valve according to claim 1 wherein the second nozzle is adapted to engage with a needle GV' of a German valve.

5. The pump valve according to claim 1 wherein the pneumatically adjustable cushion is a suspension front fork.

6. The pump valve according to claim 1 wherein the second nozzle is adapted to engage with an inflation needle for balls.

7. The pump valve according to claim 1 wherein the first nozzle is adapted to engage with a needle FV' of a French valve FV.

8. The pump valve according to claim 1 wherein the first nozzle is adapted to engage with a needle AV' of an American valve AV.

* * * * *